United States Patent
Singh et al.

(10) Patent No.: US 9,473,424 B2
(45) Date of Patent: Oct. 18, 2016

(54) ADDRESS TABLE FLUSHING IN DISTRIBUTED SWITCHING SYSTEMS

(75) Inventors: Bijendra Singh, Plano, TX (US); Melvin Tan, Richardson, TX (US); Andrew Mao, Sachse, TX (US); Ashok K. Naik, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1100 days.

(21) Appl. No.: 13/236,285

(22) Filed: Sep. 19, 2011

(65) Prior Publication Data
US 2013/0070645 A1    Mar. 21, 2013

(51) Int. Cl.
*H04L 12/931*      (2013.01)
*H04L 12/935*      (2013.01)

(52) U.S. Cl.
CPC ........... *H04L 49/351* (2013.01); *H04L 49/201* (2013.01); *H04L 49/3009* (2013.01)

(58) Field of Classification Search
CPC ....... H04L 43/12; H04L 45/04; H04L 45/00; H04L 41/12; H04L 45/02
See application file for complete search history.

(56) References Cited

U.S. PATENT DOCUMENTS

| | | | | |
|---|---|---|---|---|
| 5,592,622 A * | 1/1997 | Isfeld | .................... | G06F 13/387 709/207 |
| 5,835,723 A * | 11/1998 | Andrews et al. | ............. | 709/226 |
| 6,330,229 B1 * | 12/2001 | Jain et al. | ...................... | 370/256 |
| 6,591,325 B1 * | 7/2003 | Akashi | ................ | G06F 13/4204 710/305 |
| 6,604,136 B1 * | 8/2003 | Chang | ....................... | G06F 9/54 709/223 |
| 6,708,210 B2 * | 3/2004 | Chang | ....................... | G06F 9/54 709/223 |
| 6,865,160 B1 * | 3/2005 | Bare | ............................. | 370/256 |
| 7,660,303 B2 * | 2/2010 | Solomon et al. | ............. | 370/389 |
| 7,796,590 B1 * | 9/2010 | Melman | .................. | H04L 45/02 370/389 |
| 7,860,031 B2 * | 12/2010 | Sasagawa et al. | ............ | 370/256 |
| 8,170,033 B1 * | 5/2012 | Kothari et al. | .......... | 370/395.53 |
| 8,199,756 B2 * | 6/2012 | Sugimoto | ........... | H04L 45/7453 370/368 |
| 8,249,057 B1 * | 8/2012 | Mohaban et al. | ............ | 370/352 |
| 8,451,715 B1 * | 5/2013 | Doshi | .................... | H04L 45/66 370/218 |
| 8,611,255 B2 * | 12/2013 | Kugel | ................. | H04L 12/4625 370/255 |
| 8,659,994 B2 * | 2/2014 | Singh et al. | ................... | 370/218 |
| 8,730,963 B1 * | 5/2014 | Grosser, Jr. | ........... | H04L 12/462 370/219 |
| 2002/0124107 A1 * | 9/2002 | Goodwin | ................ | H04L 12/24 709/242 |
| 2003/0147405 A1 * | 8/2003 | Khill | ................... | H04L 12/4625 370/401 |
| 2003/0172147 A1 * | 9/2003 | Chang | ....................... | G06F 9/54 709/223 |
| 2003/0179707 A1 * | 9/2003 | Bare | ............................. | 370/235 |
| 2004/0179524 A1 * | 9/2004 | Sasagawa et al. | ............ | 370/389 |
| 2006/0100912 A1 * | 5/2006 | Kumar et al. | ..................... | 705/4 |
| 2007/0091890 A1 * | 4/2007 | Radhakrishnan et al. | .... | 370/390 |
| 2007/0226320 A1 * | 9/2007 | Hager | ............... | G06F 17/30194 709/219 |
| 2007/0245033 A1 * | 10/2007 | Gavrilescu | ........ | H04L 29/12801 709/230 |
| 2008/0232388 A1 * | 9/2008 | Sugimoto | ........... | H04L 45/7453 370/428 |
| 2009/0052317 A1 * | 2/2009 | Takagi | .................... | H04L 41/12 370/223 |
| 2009/0154349 A1 * | 6/2009 | Bernard | ............. | H04Q 11/0067 370/235 |
| 2010/0159967 A1 * | 6/2010 | Pounds | ................... | H04L 51/14 455/466 |
| 2010/0174869 A1 * | 7/2010 | Gorobets | ............ | G06F 12/0246 711/135 |

(Continued)

*Primary Examiner* — Hassan Phillips
*Assistant Examiner* — Prenell Jones
(74) *Attorney, Agent, or Firm* — Baker Botts L.L.P.

(57) ABSTRACT

Methods and systems for improved address table flushing in distributed switching systems may be provided. In accordance with embodiments of the disclosure, a switch may include a plurality of line cards and a processor. Each line card may including a table of addresses. The processor may be configured to, in response to receipt of a plurality of simultaneous requests, each request a request to flush addresses associated with a particular flooding domain present on the switch, perform flushing of addresses based on an aggregate number of address entries for each particular flooding domain associated with the requests.

16 Claims, 4 Drawing Sheets

(56) References Cited

U.S. PATENT DOCUMENTS

| | | | |
|---|---|---|---|
| 2011/0019679 A1* | 1/2011 | Akahane | H04L 12/437 370/401 |
| 2011/0125944 A1* | 5/2011 | Riocreux et al. | 710/107 |
| 2011/0280242 A1* | 11/2011 | Kugel | H04L 12/4625 370/392 |
| 2012/0033665 A1* | 2/2012 | Jacob Da Silva | H04L 45/245 370/389 |
| 2012/0033672 A1* | 2/2012 | Page et al. | 370/395.53 |
| 2012/0039335 A1* | 2/2012 | Subramanian et al. | 370/390 |
| 2012/0044837 A1* | 2/2012 | Ibanez Fernandez | H04L 45/02 370/256 |
| 2012/0106395 A1* | 5/2012 | White et al. | 370/254 |
| 2012/0127854 A1* | 5/2012 | Khetan et al. | 370/218 |
| 2012/0201232 A1* | 8/2012 | Velusamy | H04W 24/02 370/338 |
| 2012/0320929 A9* | 12/2012 | Subramanian et al. | 370/419 |
| 2013/0003739 A1* | 1/2013 | Raman et al. | 370/392 |

* cited by examiner

ADDRESS TABLE FLUSHING IN DISTRIBUTED SWITCHING SYSTEMS

TECHNICAL FIELD OF THE INVENTION

The present invention relates generally to networked communications and, more particularly, to efficient flushing of address entries from distributed address tables (e.g., Media Access Control or "MAC" addresses).

BACKGROUND

In distributed switching systems, switching entities perform information forwarding, learning, and aging out of forwarding entries. If a switching entity contains multiple switching subunits, each switching subunit may have its own forwarding table in which information about network addresses is stored. Switching functionalities such as information forwarding, learning, and aging out of forwarding entries are carried out on a per-switching subunit basis. This architecture requires that most of the configurations to operate a switch need to be applied on a per-switching subunit basis and must be repeated for each switching subunit.

SUMMARY

Methods and systems for improved address table flushing in distributed switching systems may be provided. In accordance with embodiments of the disclosure, a switch may include a plurality of line cards and a processor. Each line card may including a table of addresses. The processor may be configured to, in response to receipt of a plurality of simultaneous requests, each request a request to flush addresses associated with a particular flooding domain present on the switch, perform flushing of addresses based on an aggregate number of address entries for each particular flooding domain associated with the requests.

One or more other technical advantages of the present disclosure may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
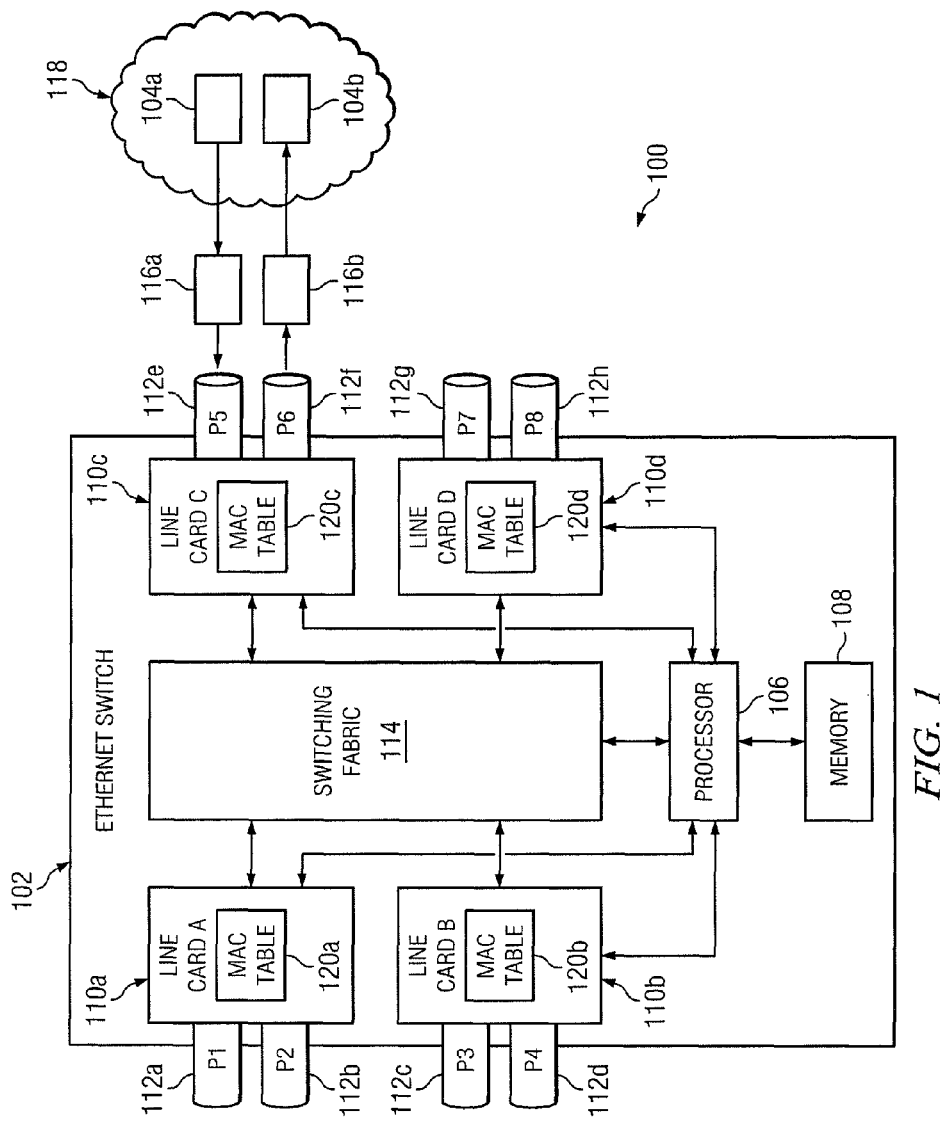
FIG. 1 is an example of a switching system based upon a switch configured to forward information between networks, computing entities, or other switching entities, in accordance with embodiments of the present disclosure.

FIG. 1 is an example of a switching system 100 based upon a switch 102 configured to forward information between networks, computing entities, or other switching entities. Switch 102 may include one or more ports 112, each communicatively coupled to one or more network entities 104. Such coupling may be accomplished over a network 118. Switch 102 may include one or more line cards 110, coupled to each other by way of a switching fabric 114. Switch 102 may include a table 120 specific to each line card 110. Tables 120 may include communication and forwarding information regarding network entities connected to ports 112 for which addresses have been learned. Switch 102 may include a processor 106 coupled to a memory 108. Processor 106 may be coupled to switching fabric 114 and the line cards 110.

Inbound frame 116a may be implemented in packets, frames, cells, or other received data to be forwarded. When an inbound frame 116a is received into a given port 112, the destination of the information may be looked up in table 120 to determine which port 112 the information should be sent. As demonstrated in FIG. 1 and in subsequent figures, inbound frame 116a may be received on any suitable port 112 of switch 102.

Switch 102 may be implemented in any suitable electronic device for carrying out the embodiments taught by the present disclosure. In one embodiment, switch 102 may be implemented as an Ethernet switch. Switch 102 may be configured to receive information to be forwarded to network destinations, and the information may be implemented in any form suitable for switch 102 to forward. In one embodiment, the information received may be implemented in an inbound frame 116a. Likewise, switch 102 may be configured to forward information in any suitable form, and likely the same form in which it was received. In one embodiment, the forwarded information may be implemented in an outbound frame 116b.

Switch 102 may be configured to communicate with any suitable network entity 104 to receive and send information such as frames 116. Network entities 104 may be embodied by, for example, a computer, router, switch, network device, sub-network or network. Network 118 may be embodied by, for example, a local-area-network, wide-area-network, the Internet, an intranet, or any other suitable communications network. Switch 102 may be configured to send and receive information through ports 112 on their respective line cards 110. Switch 102 may be configured to determine upon receipt of a frame 116a, which of the ports 112 should the outbound frame 116b be sent, based in part upon the contents of tables 120 associated with each line card. Switch 102 may be configured to act upon received information by the configuration of line cards 110, switching fabric 114, and/or processor 106.

Line cards 110 may be implemented in any suitable manner to create the embodiments described in this disclosure. In one embodiment, line cards 110 may be implemented in a module including electronic circuitry, processors, and/or memory for handling communications through one or more ports 112. Each line card 110 may contain a table 120. In one embodiment, each table 120 may be implemented in the corresponding line card 110, such as being stored in a memory associated with the line card 110. In another embodiment, table 120 may be implemented elsewhere in switch 102. Line card 110 may be configured to determine to what other line cards 110 in switch 102, information received from port 112 should be forwarded.

Line card 110 may be configured to make such determinations based on the contents of an associated table 120. Line card 110 may be configured to forward information received from port 112 to another line card 110 of switch 102 through switching fabric 114. Switching fabric 114 may be implemented in any suitable combination of hardware and software for connecting line cards 110 to each other to transmit information between the line cards 110. Switching fabric 114 may be controlled through configuration by processor 106.

Processor 106 may comprise, for example, a microprocessor, microcontroller, digital signal processor (DSP), application specific integrated circuit (ASIC), or any other digital or analog circuitry configured to interpret and/or execute program instructions and/or process data. Processor 106 may interpret and/or execute program instructions and/or process data stored in memory 108. Memory 108 may comprise any system, device, or apparatus configured to hold and/or house one or more memory modules. Each memory module may include any system, device or apparatus configured to retain program instructions and/or data for a period of time (e.g., computer-readable media). In one embodiment, each line card 110 may contain one or more memory modules, containing at least an associated table 120. In another embodiment, each line card 110 may share memory 108 to store tables 120.

Tables 120 may be implemented in any suitable manner to store and make available to switch 102 and line cards 110 information concerning other network entities 104 in switching system 100 and how the network entities 104 may be accessed through ports 112. Tables 120 may include, for example, information regarding addresses of network entities 104, information regarding flooding domains 202, and information regarding which port 112, the address may be reached. Tables 120 may be configured as forwarding tables to provide information to switch 102 on how to forward information to other entities. In one embodiment, each table 120 may be implemented in its respective line card 110. In another embodiment, tables 120 may be implemented together, but coupled to each line card 110. Tables 120 may be implemented, for example, in logic, a memory, or circuitry. If a table 120 is implemented in a line card 110, table 120 may be implemented in memory of line card 110.

Figure 2:
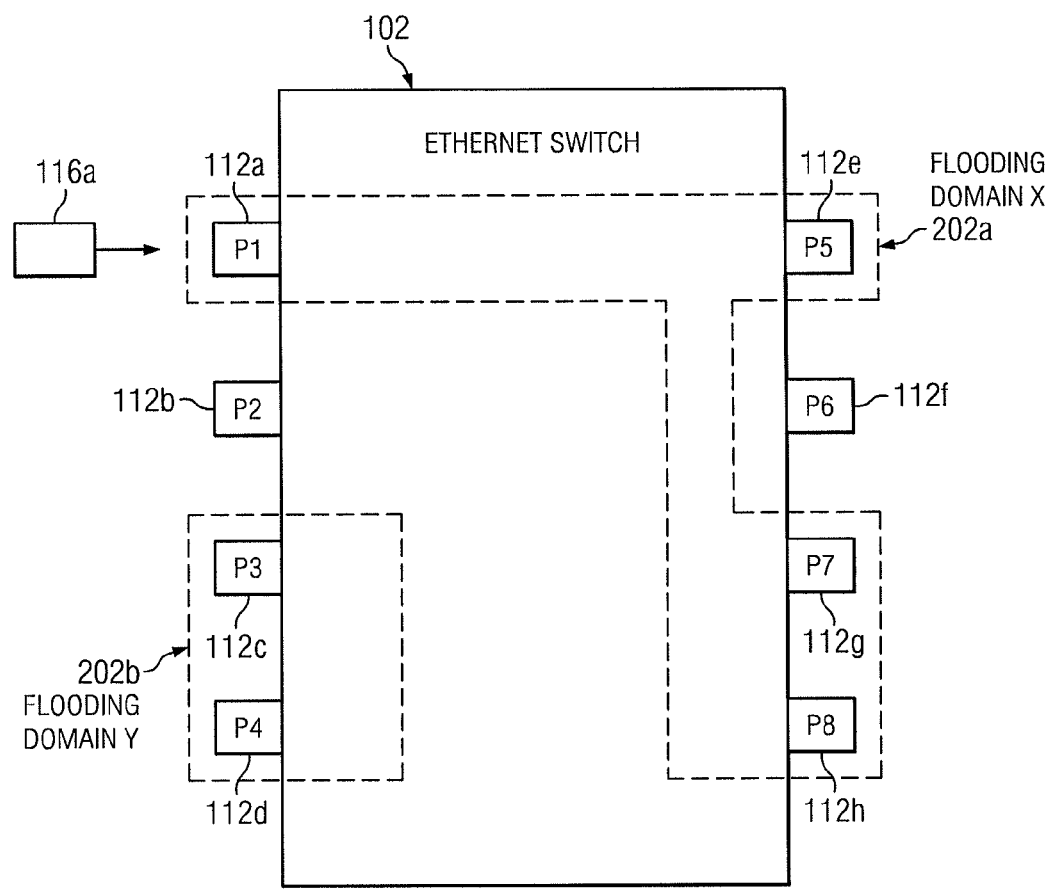
FIG. 2 is an illustration of an example assignment of one or more ports to a flooding domain, in accordance with embodiments of the present disclosure.

FIG. 2 is an illustration of an example assignment of one or more ports 112 to a flooding domains. In the example of FIG. 2, ports P1, P5, P7, and P8 are assigned to flooding domain 202a, while ports P3 and P4 are assigned to flooding domain 202b. Association of ports with flooding domains may be accomplished by processor 106, switching fabric 114, or any other suitable portion of switch 102. Flooding domains 202 may be associated with a VLAN. A flooding domain 202 may represent all ports 112 of switch 102 that may be flooded if the actual location of the destination of inbound frame 116a is not known. Such ports may be flooded by forwarding inbound frame 116a to each network destination 104 coupled to each such port 112. In the example of FIG. 2, an inbound frame 116a may be received on port P1. For example, if inbound frame 116a contains a destination MAC address of "0000.0000.1111," and no such entry exists in the tables associated with the flooding domain, then the frame may be forwarded through ports P5, P7, and P8. If such an address was known in the tables associated with the flooding domain, then the entry for the address would identify the appropriate egress port through which the frame would be sent. The ports 112 of switch 102 may be arranged into flooding domains 202 in any suitable fashion. In one embodiment, the ports 112 of switch 102 may be rearranged during operation of the switch 102.

Figure 3:
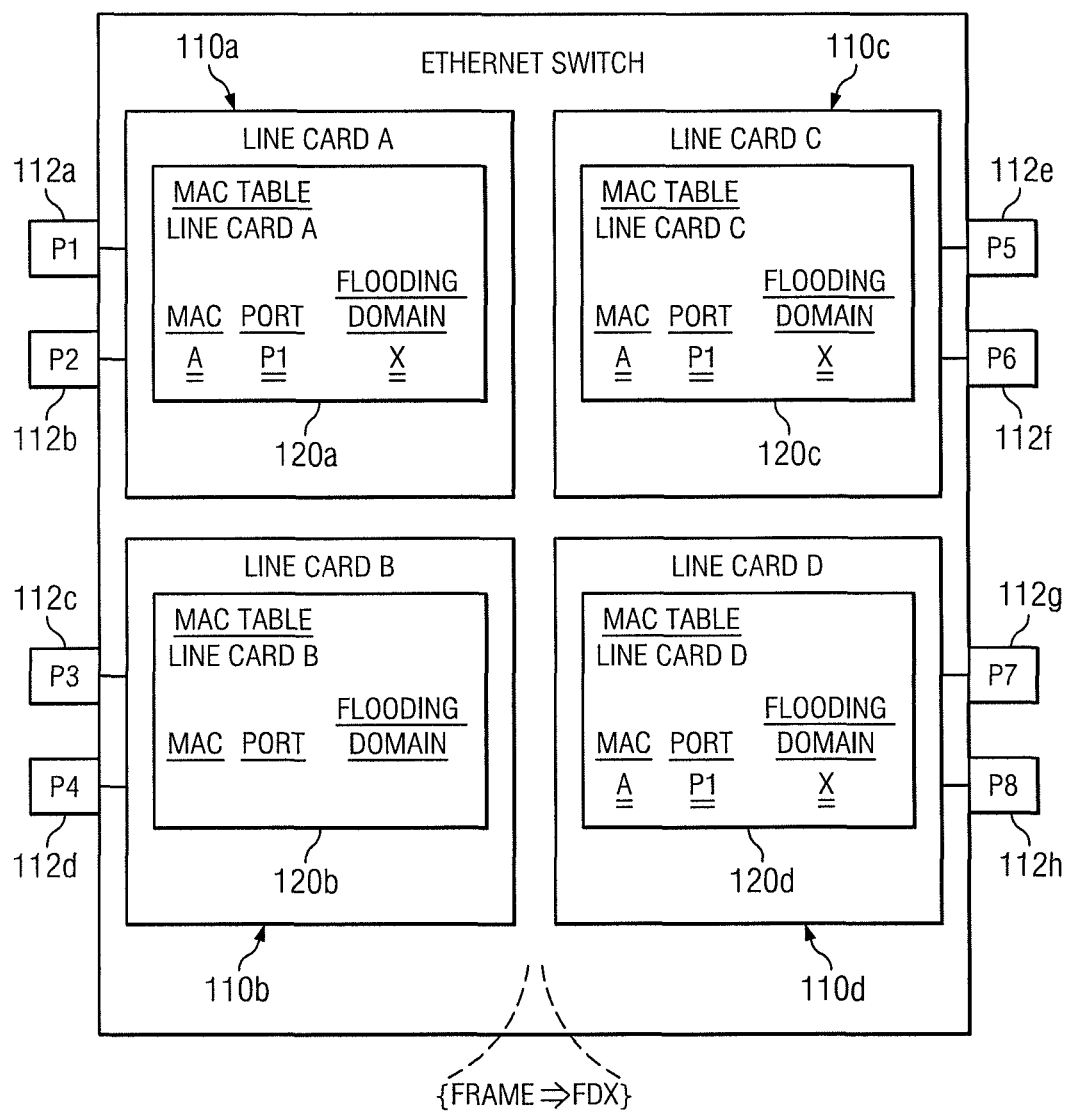
FIG. 3 is a more detailed illustration of the operation of a system and tables configured to provide efficient space utilization of distributed address tables in switches while flooding information, in accordance with embodiments of the present disclosure.

FIG. 3 is a more detailed illustration of distributed address tables 120 in switches 102. Table 120 may include information, for a given address and flooding domain, identifying which port 112 may be used to access the address. The addresses used by table 120 may comprise MAC addresses.

In many distributed networks, a switching protocol (e.g., Spanning Tree Protocol or other suitable protocol) may dictate that when a network topology changes, learned MAC addresses in a domain so that they may be learned to reflect new network topology computed by the switching protocol. Such flushing and relearning of MAC addresses may be performed to prevent network "black holing," in which traffic continues to be sent to ports which were reachable prior to the routing protocol's new computed topology. When address flushing occurs, all traffic for a domain is flooded to all ports in accordance with relevant networking standards. Both flooding and black holing consume available resources, and thus, any reduction in the occurrence of such flushing and flooding may improve performance.

Switching system 100 may be configured to improve MAC address table flushing and repopulation, as compared with traditional approaches. For example, switching system 100 may be configured to, when receiving substantially simultaneous requests to flush MAC addresses for a plurality of flooding domains, determine which flooding domain has the higher number of MAC address entries to flush, and then flush such entries first in response to the substantially simultaneous requests. Such flushing priority to flooding domains with a greater number of MAC address entries may improve performance, as the likelihood of black holing of traffic for MAC addresses may be higher for a flooding domain with a greater number of MAC address entries. Example embodiments of such flushing priority are described below with respect to FIGS. 4-10B below.

Figures 4, 5:
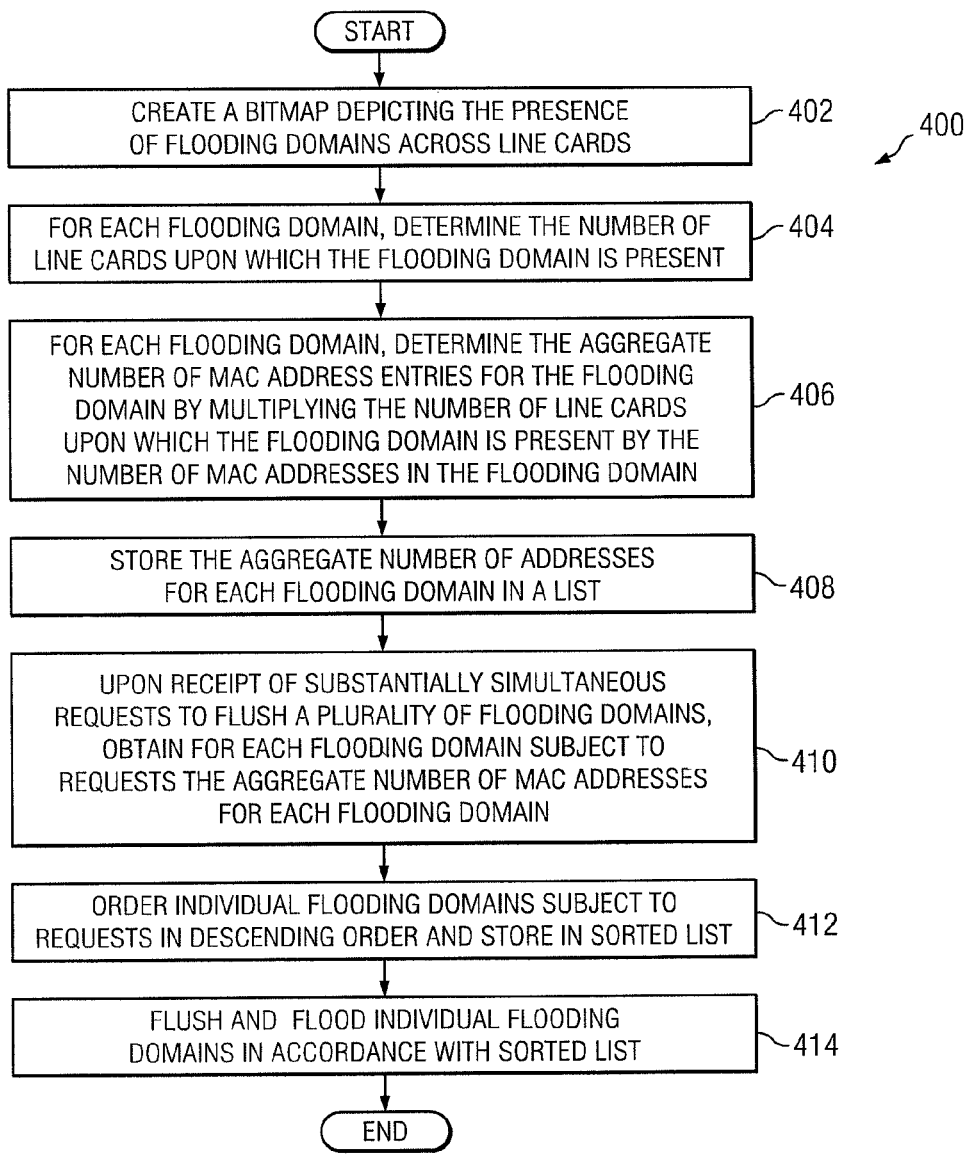
FIG. 4 illustrates a flow chart of an example method for determining flushing priority in a switching system, in accordance with embodiments of the present disclosure.
FIG. 5 depicts an example bit matrix for depicting the presence of flooding domains across line cards, in accordance with embodiments of the present disclosure.

FIG. 4 illustrates a flow chart of an example method 400 for determining flushing priority in a switching system, in accordance with embodiments of the present disclosure. Method 400 may be performed by processor 106 (e.g., processor 106 reading and executing a program of instructions stored in memory 108) or another component of system 100. According to one embodiment, method 400 may begin at step 402. As noted above, teachings of the present disclosure may be implemented in a variety of configurations system 100. As such, the preferred initialization point for method 400 and the order of the steps 402-414 comprising method 400 may depend on the implementation chosen.

At step 402, a system (e.g., system 100) may create a data structure depicting the presence of flooding domains across line cards. For example, the system may create a bit matrix for depicting the presence of flooding domains across line cards, as shown in the example bit matrix 500 of FIG. 5. As shown in FIG. 5, bit matrix 500 may, in some embodiments, be embodied in a matrix having a particular number of rows and a particular number of columns. In other embodiments, bit matrix 500 may be embodied in an array of bitsets. Bit matrix 500 may be stored in memory 108, or by another suitable component of system 100. Each entry in bit matrix 500 may indicate whether a particular flooding domain is present in a particular line card. For example, in certain embodiments of bit matrix 500, columns may correspond to line cards while rows may correspond to flooding domains in a system, such as shown in FIG. 5. In other embodiments of bit matrix 500, rows may correspond to line cards while columns may correspond to flooding domains in a system.

In embodiments in which columns correspond to line cards and rows correspond to flooding domains, bit matrix 500 may have a number of columns equal to the number of line cards in the system (such that each column represents a particular line card) and may have a number of rows equal to the number of flooding domains in the system (such that each row represents a particular flooding domain 202). Thus, for the example bit matrix 500 shown in FIG. 5, the system represented by bit matrix 500 has four line cards and five domains. Each entry in bit matrix 500 may have a value indicating whether or not the flooding domain represented by the row having the entry is present in the line card represented by the column having the entry. In some embodiments, each entry in bit matrix 500 may be binary (e.g., "0" or "1"). For example, an entry of "1" may indicate presence of a flooding domain in a line card, while an entry of "0" may indicate absence of a flooding domain in a line card 110. As will be seen below, an entry of "0" may also indicate a corresponding line card and/or domain from which mapping table entries have been collected. Thus, in example bit matrix 500 depicted in FIG. 5, flooding domain 1 is present on line cards 1, 3, and 4, flooding domain 2 is present on line card 2, flooding domain 3 is present on line cards 2 and 3, flooding domain 4 is present on line cards 2 and 4, and flooding domain 5 is present on line card 3. At step 404, for each flooding domain, the system may determine the number of line cards upon which the flooding domain is present. In some embodiments, such determination may be made by analyzing bit matrix 500 to determine for each row/flooding domain how many bit matrix 500 entries indicate presence of the flooding domain in a particular column/line card.

At step 406, for each flooding domain, the system may determine the aggregate number of MAC address entries present on all line cards for which the flooding domain is present by multiplying the number of line cards upon which the domain is present by the number of MAC addresses in the flooding domain. At step 408, the system may store the aggregate number of MAC address entries for each flooding domain in a list. In some embodiments, the list may include a data structure permitting an entry in the list to be indexed by unique identifiers associated with the flooding domains (e.g., VLAN service identifiers (SIDs) of the flooding domains). Such list may be stored in a memory (e.g., memory 108).

At step 410, in response to receipt of substantially simultaneous requests to flush MAC address entries for a plurality of flooding domains (e.g., as a result of a change in topology), the system may, based on unique identifiers associated with the flooding domains, obtain for each individual flooding domain subject to the requests the aggregate number of MAC address entries present on all line cards for which the individual flooding domain is present. At step 412, the system may order the individual flooding domains subject to the substantially simultaneous request in descending order in a sorted list, such that entries for flooding domains have the highest numbers of aggregate MAC address entries appear at the top of the list. In the event the number of aggregate MAC addresses for two or more flooding domains is the same, such two or more flooding domains may be listed in the sorted list in any order relevant to each other (e.g., the system may randomly select which flooding domain appears first, or may determine which one is listed first by any suitable factor, such as the flooding domain with the lowest unique identifier).

At step 414, the system may perform flushing and flooding of individual flooding domains in accordance with the order set forth in the list. In some embodiments, the system may, after flushing MAC address entries for one flooding domain, wait a particular predetermined interval before flushing the next flooding domain on the list, so as to allow the first flooding domain to relearn MAC addresses.

After completion of step 414, method 400 may end. Alternatively, in some embodiments, after completion of step 414, method 400 may proceed again to step 402. In yet other embodiments, method 400 may repeat steps 410-414 over and over again for each time substantially simultaneous flush requests are received. Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software and/or firmware embodied in computer-readable media.

A component of system 100 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. For the purposes of this disclosure, computer-readable media and/or computer-executable storage media may include any instrumentality or aggregation of instrumentalities that may retain data and/or instructions for a period of time. Computer-readable media and/or computer-executable storage media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A switch, comprising:
a plurality of line cards, each line card including a table of addresses; and
a processor configured to
determine an aggregate number of address entries for each flooding domain present on the switch by
determining a number of line cards upon which each flooding domain is present,
determining a number of addresses in each flooding domain, and
for each flooding domain, multiplying the number of line cards upon which the flooding domain is present by the number of addresses in the flooding domain, and
in response to receipt of a plurality of substantially simultaneous requests, each request being a request to flush addresses associated with a particular flooding domain present on the switch, perform flushing of addresses based on an aggregate number of address entries for each particular flooding domain associated with the requests.

2. A switch according to claim 1, the processor configured to perform flushing by flushing addresses associated with each particular flooding domain in order of the aggregate number of address entries for each particular flooding domain.

3. A switch according to claim 1, the processor further configured to perform flooding based on the aggregate number of address entries for each particular flooding domain associated with the requests.

4. A switch according to claim 1, the processor further configured to store the aggregate number of addresses for each flooding domain in a list.

5. A switch according to claim 2, the processor further configured to:
sort into a sorted list individual flooding domains subject to the substantially simultaneous requests in descending order of the aggregate number of addresses; and
perform flushing based on an order of flooding domains in the sorted list.

6. A method comprising:
receiving, at a switch, one or more requests, each request being a request to flush addresses associated with a particular flooding domain present on the switch and stored on address tables as address entries of one or more line card;
determining an aggregate number of address entries for each flooding domain present on the switch by
determining a number of line cards upon which each flooding domain is present,
determining a number of addresses in each flooding domain, and
for each flooding domain, multiplying the number of line cards upon which the flooding domain is present by the number of addresses in the flooding domain; and
in response to receipt of a plurality of substantially simultaneous requests, flushing addresses based on an aggregate number of address entries for each particular flooding domain associated with the requests.

7. A method according to claim 6, wherein flushing addresses comprises flushing addresses associated with each particular flooding domain in order of the aggregate number of address entries for each particular flooding domain.

8. A method according to claim 6, further comprising flooding based on the aggregate number of address entries for each particular flooding domain associated with the requests.

9. A method according to claim 6, further comprising storing the aggregate number of addresses for each flooding domain in a list.

10. A method according to claim 7, further comprising:
sorting into a sorted list individual flooding domains subject to the substantially simultaneous requests in descending order of the aggregate number of addresses; and
flushing based on an order of flooding domains in the list.

11. An article of manufacture comprising:
a non-transitory computer readable medium; and
computer-executable instructions carried on the computer readable medium, the instructions readable by a processor included in a switch, the instructions, when read and executed, for causing the processor to:
receive one or more requests, each request being a request to flush addresses associated with a particular flooding domain present on the switch and stored on address tables as address entries of one or more line card;
determine an aggregate number of address entries for each flooding domain present on the switch by
determining a number of line cards upon which each flooding domain is present,
determining a number of addresses in each flooding domain, and
for each flooding domain, multiplying the number of line cards upon which the flooding domain is present by the number of addresses in the flooding domain; and
in response to receipt of a plurality of substantially simultaneous requests, flush addresses based on an aggregate number of address entries for each particular flooding domain associated with the requests.

12. An article of manufacture according to claim 11, the instructions for further causing the processor to flush addresses by flushing addresses associated with each particular flooding domain in order of the aggregate number of address entries for each particular flooding domain.

13. An article of manufacture according to claim 11, the instructions for further causing the processor to perform flooding based on the aggregate number of address entries for each particular flooding domain associated with the requests.

14. An article of manufacture according to claim 11, the instructions for further causing the processor to store the aggregate number of addresses for each flooding domain in a list.

15. An article of manufacture according to claim 12, the instructions for further causing the processor to:
sort into a sorted list individual flooding domains subject to the substantially simultaneous requests in descending order of the aggregate number of addresses; and
flush based on an order of flooding domains in the list.

16. A switch, comprising:
a plurality of line cards, each line card including a table of addresses; and
a processor configured to
determine an aggregate number of address entries for each flooding domain present on the switch, sort, into a sorted list, individual flooding domains in descending order of the aggregate number of addresses, and in response to receipt of a plurality of substantially simultaneous requests, each request being a request to flush addresses associated with an individual flooding domain present on the switch, perform flushing based on the order of flooding domains in the sorted list.

\* \* \* \* \*